United States Patent Office 3,432,902
Patented Mar. 18, 1969

3,432,902
ROLL ASSEMBLY FOR REDUCING WORK AND
ROLL FOR SUCH ASSEMBLY
Selwyn R. Rackoff, Pittsburgh, and Martin J. Dempsey, Bethel Park, Pa., assignors to American Shear Knife Co., West Homestead, Pa., a corporation of Pennsylvania
Filed Mar. 24, 1967, Ser. No. 625,711
U.S. Cl. 29—125
Int. Cl. B21b 31/08
10 Claims

ABSTRACT OF THE DISCLOSURE

A roll assembly for reducing rod. A tungsten-carbide roll is held between clamping rings, one of which, may be a mounting hub. The inner periphery of the roll is tapered and the tapered surfaces are engaged coextensively by abutting surfaces of the clamping rings. The rings are clamped by axial bolts which may pass through the roll. The clamping force has a component of force perpendicular to the tapered surfaces of the roll, which pretensions the rolls.

Background of the invention

The invention relates to the art of reducing work by rolling and has particular relationship to the reduction of work by rolling with rolls of materials or metalloids of the tungsten-carbide type. The expression "of the tungsten-carbide type" as used in this application means primarily tungsten carbide (WC) and its alloys. It also means other hard metalloids such as titanium carbide, molybdenum carbide, tantalum carbide, niobium carbide and numerous others including borides, silicides, nitrides, and the like, and their alloys. For an elaborate list of these metalloids reference is made to Goetzel 2,581,252, particularly column 6, beginning line 16.

In the interest of concreteness this invention is discussed in this application with reference to the rolling or reduction of rod. The reduction of rod is carried out by oppositely engaging the reducing rolls of a pair of roll assemblies in reducing relationship with the rod while rotating the assemblies and advancing the rod. The reducing roll is of the tungsten-carbide type, and is in the form of an annulus. In accordance with the teachings of the prior art this roll is in the form of a cylindrical annulus with a groove for engaging the work in its outer periphery and is sweated or shrunk onto a hub of steel or the like. In use the assembly is rotated, by driving the hub, with the roll in reducing engagement with the work. This prior-art roll assembly has proved unsatisfactory because the tungsten-carbide rolls have repeatedly cracked or fractured soon after the assembly was put into use.

Attempts have also been made to clamp the rolls between clamping rings, one of which serves as a hub. This has also proved unsatisfactory for the same reasons.

It is an object of this invention to overcome the above-described disadvantage of the prior-art assemblies and to provide a roll assembly having a roll of the tungsten-carbide type which shall not crack or fracture in service.

This invention arises from the realization that in reducing the rod the roll is subjected to tensional stresses. Materials of the tungsten-carbide type have low resistance to tension and the tensional stresses impressed on the roll, in reducing the work, cracks or fractures the roll. Another source of tensional stress on the roll is the stress developed when, during a rolling operation, the temperature of the assembly rises and sharp temperature gradients develop throughout the assembly. The hub, being composed of steel or other metal, has a higher coefficient of thermal expansion than the roll and in expanding exerts tensile stress on the rolls at their interface. This tensile stress may damage the roll.

Summary of the invention

In accordance with this invention a roll assembly is provided in which the roll is held by clamping means which not only clamps the roll firmly, but also, pretensions the roll. In the use of the apparatus the pretension is counteracted by the reactive force of the work and the effect of this reactive force on the roll is minimized.

In the typical practice of this invention the roll is held by cooperative clamping rings, one of which serves as a mounting hub which is driven to rotate the roll. In accordance with this invention the inner periphery of the roll is tapered, or is formed of converging frusto-conical surfaces, and the surfaces of the clamping rings are correspondingly tapered so that the inner surfaces of the roll and the surfaces of the clamping rings are coextensive. Axial clamping force is applied between the ring. This force has components perpendicular to the inner surfaces of the rolls and pretensions the roll.

The magnitude of the pretension force is determined by the applied or impressed clamping force and by the angle between the tapered or frusto-conical surfaces or the angle of these surfaces to the axis of the roll. The pretension force increases as the angles between the frusto-conical surfaces and the axis of the roll increase, or, as the angle between the frusto-conical surfaces decreases. The setting of these angles must take into consideration, on the one hand, the desirability of providing adequate pretension to counteract properly the reactive force of the work and, on the other hand, the undesirability of impressing such a high pretension force that the roll is fractured. In the typical practice of this invention, the angle between the conical surfaces (assumed to be of equal width) is in one case 160° and in another 120°.

In accordance with an aspect of this invention, where the angle between the frusto-conical surfaces is smaller, the bolts which apply the clamping force pass through holes in the roll. In this case two of these holes which are diametrically opposite are precisely dimensioned to fit the bolts. The precise dimensioning is achieved, in accordance with this invention, by forming these holes by electric-discharge machining.

Brief description of the drawings

For a better understanding of this invention, both as to its organization and as to its method of operation, together with additional objects and advantages thereof, reference is made to the following description, taken in connection with the accompanying drawings, in which:

FIGS. 11 through 16 are included herein for the purpose of aiding those skilled in the art in practicing this invention and not with any intention of in any way limiting this invention.

*Description of the preferred embodiments*

Figure 1:
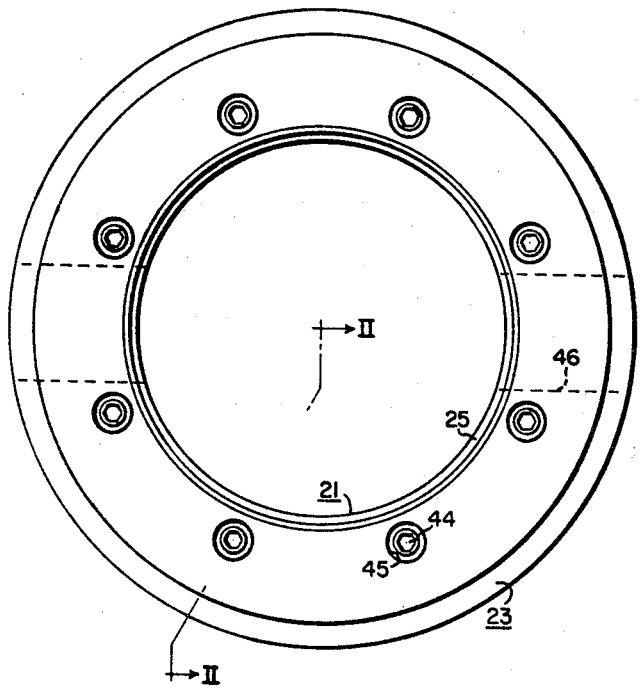
FIGURE 1 is a plan view of a roll assembly constituting an embodiment of this invention.
Figure 2:
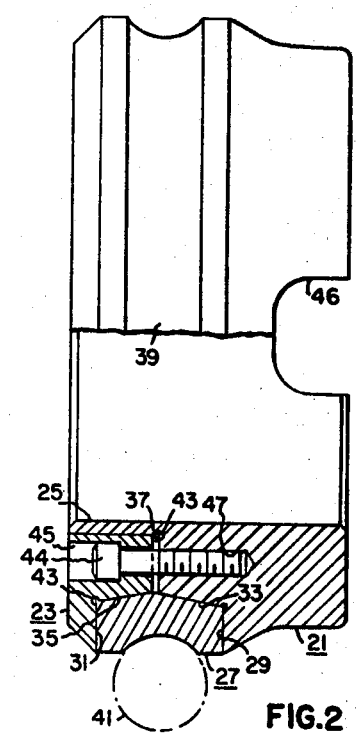
FIG. 2 is a view partly in transverse section taken along line II—II of FIG. 1 and partly in side elevation.
Figure 3:
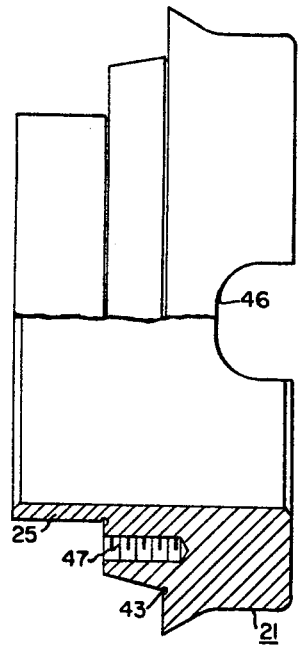
FIG. 3 is a view in transverse section showing a clamping ring of the assembly of FIG. 1 which serves as a mounting hub.
Figure 4:
FIG. 4 is a view in transverse section showing the clamping ring which cooperates with the driving hub to hold the roll.
Figure 11:
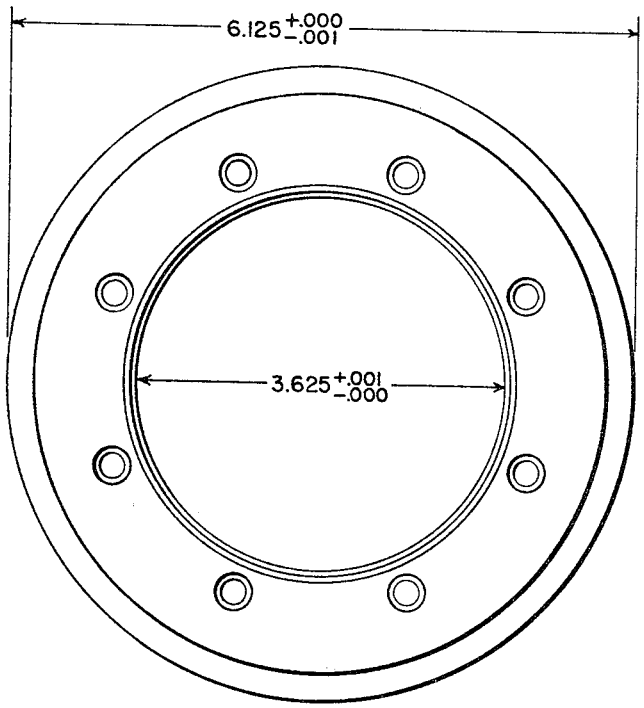
Figure 12:
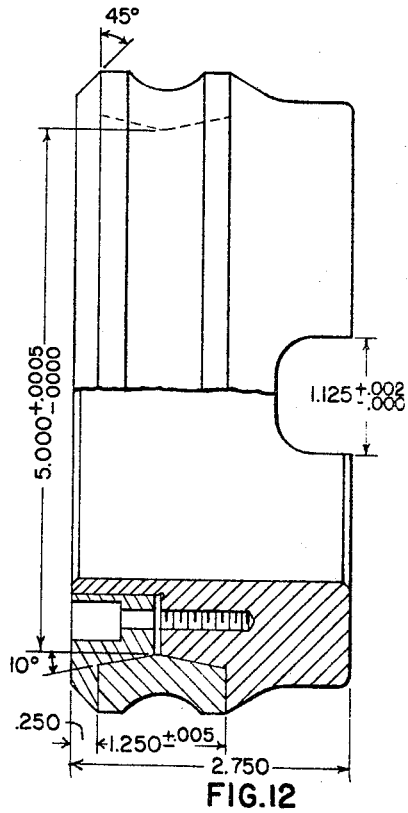

The assembly shown in FIGS. 1 through 4 and 11 and 12 includes a clamping ring 21 which may also be described as a mounting hub. In addition there is a cooperative clamping ring 23. The ring 21 is generally hollow cylindrical and it has a shoulder from which an annular projection 25 extends and which serves as a seat for the clamping ring 23. The ring 21 has a keyway 46 where it is engaged by a key (not shown) on the shaft (not shown) which drives the assembly. The rings 21 and 23 cooperatively define a circular cavity or groove in which is mounted a roll 27 composed of a material of the tungsten-carbide type.

The roll 27 is of generally cylindrical form having bases 29 and 31 which engage abutting circular surfaces of the cavity. Frusto-conical surfaces 33 and 35 taper outwardly from the bases 29 and 31 terminating in a narrow circular strip 37. The surfaces of the rings 21 and 23 which abut the surfaces 33 and 35 respectively are coextensive with, and engage, the surfaces 33 and 35 at the interface. The roll is provided with a groove 39 in its outer periphery where it engages the rod 41 to be reduced. The ring 21 has undercuts 43 in which the corners of the roll 27 and the ring 23 are seated.

The rings 21 and 23 clamp the roll 27 between them. The clamping force is applied by a plurality of bolts 44 circumferentially around the rings which pass through holes 45 in the ring 23 and are screwed into coextensive threaded holes 47 in the ring 21. Typically the bolts are Nylok bolts and lock themselves in the threads into which they are screwed. The bolts are further secured by Loctite pressure setting resin. The bolts apply an axial force between the clamping rings 21 and 23 and the roll 27. This force has components perpendicular to the surfaces 33 and 35 which pretension or prestress the roll 27. The pretension tends to neutralize the reactive force impressed by the work 41. In addition when, during rolling of the work 41, the bolts become hot and relax, the rings 21 and 23 then tend to move axially away from each other slightly. There is then a tendency for the surfaces 33 and 35 and their abutting surfaces of the rings 21 and 23 respectively to separate. This tendency counteracts the tension on the roll 27 exerted by the expansion of the rings 21 and 23, reducing the tension caused by this expansion.

Figure 5:
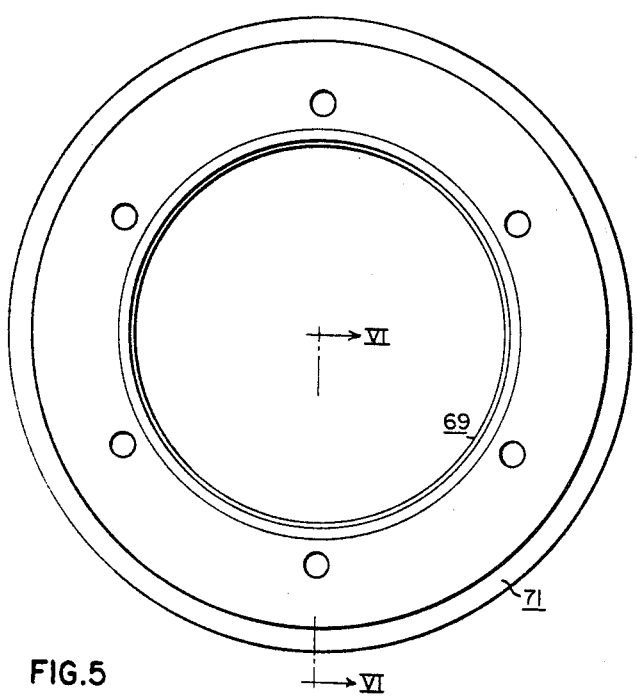
FIG. 5 is a plan view of a roll assembly which constitutes a modification of this invention.
Figure 6:
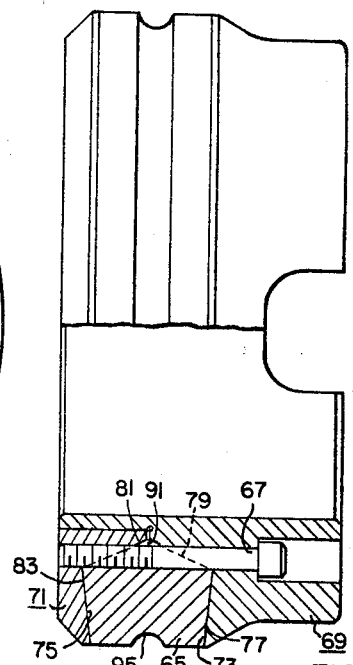
FIG. 6 is a view in transverse section taken along line VI—VI of FIG. 5.
Figure 7:
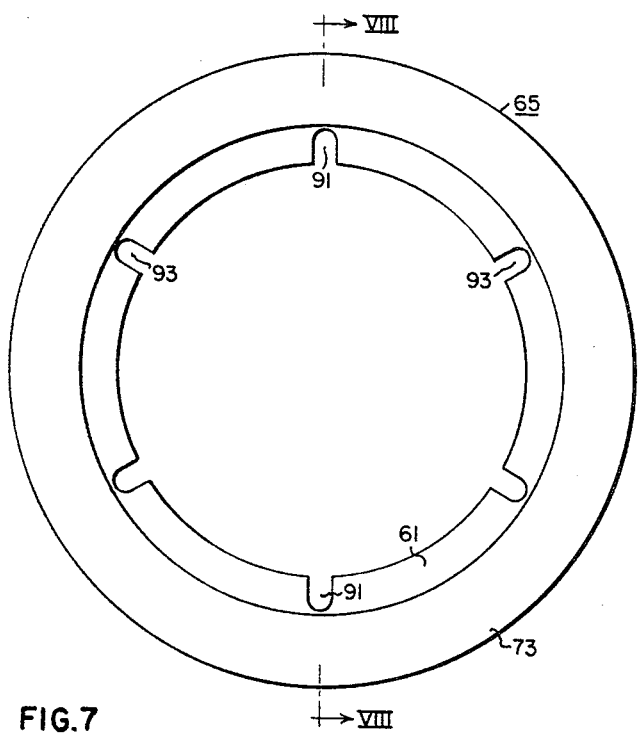
FIG. 7 is a plan view of the roll of the assembly of FIG. 5.
Figure 8:
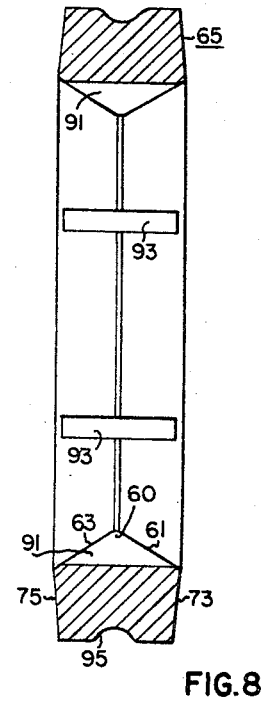
FIG. 8 is a view in transverse section taken along line VIII—VIII of FIG. 7.
Figure 9:
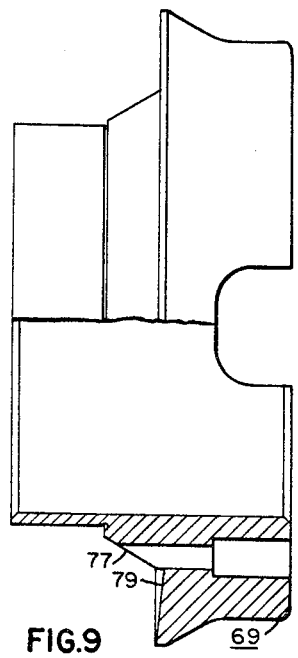
FIG. 9 is a view in transverse section showing the clamping ring which serves as mounting hub of the assembly of FIG. 5.
Figure 15:
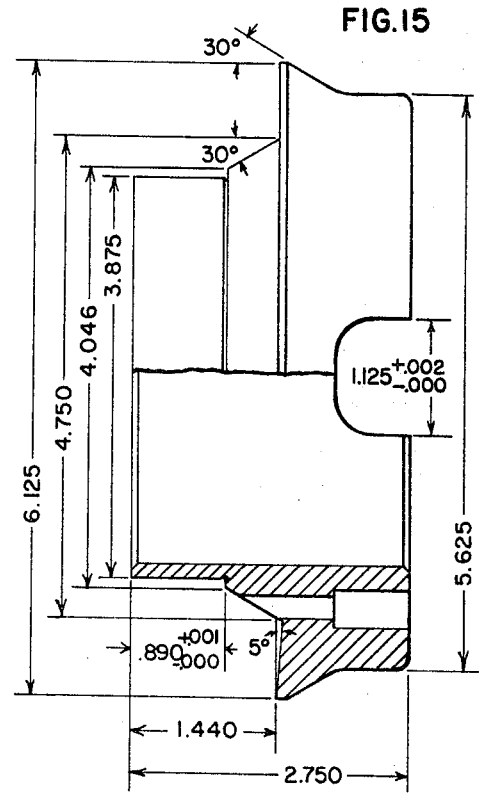
FIGS. 11, 12, 13, 14, 15 and 16 are views similar to FIGS. 1, 2, 7, 8, 9 and 10 respectively but showing the dimensions of assemblies as shown in FIGS. 1 and 5 actually used in the practice of this invention.
Figure 10:
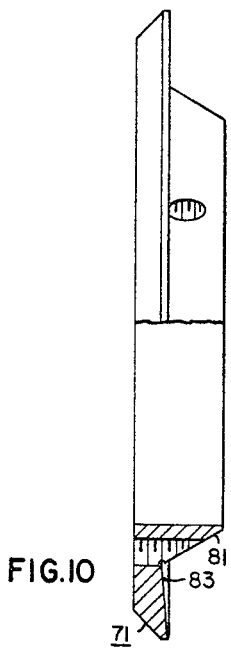
FIG. 10 is a view in transverse section showing the clamping ring which cooperates with the mounting hub of the assembly shown in FIG. 5 to clamp the roll.
Figure 16:
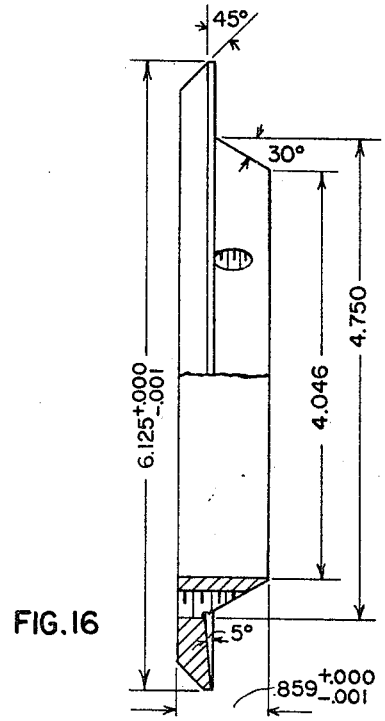
Figure 13:
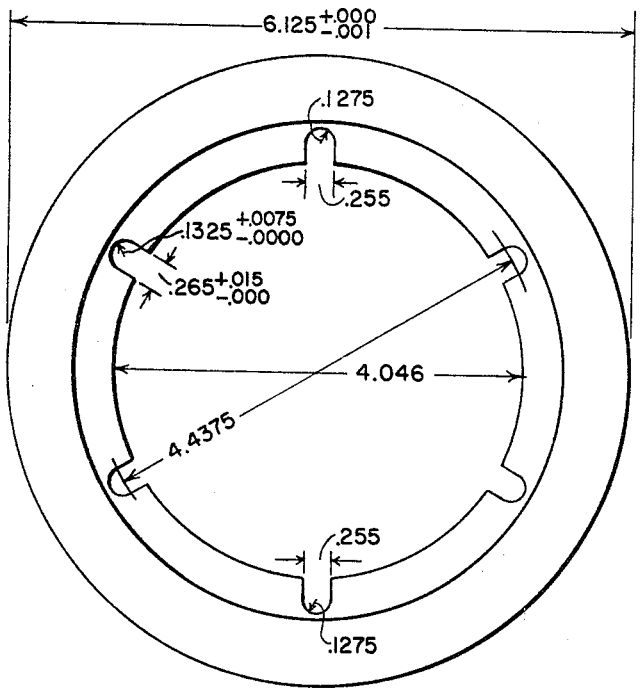
Figure 14:
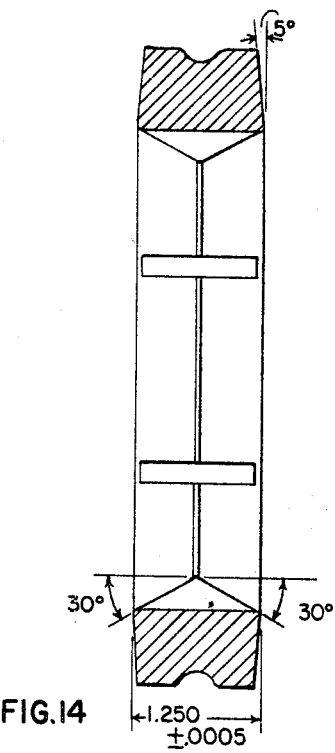

The assembly shown in FIGS. 5 through 10 and 13 through 16 is similar to that shown in FIGS. 1 through 4 except that the angle 60 between tapered surfaces 61 and 63 of the roll 65 is substantially smaller, and the clamping bolts 67 penetrate the roll 65 as well as the mounting hub 69 which serves as one clamping ring and the cooperative clamping ring 71. In this case also the surfaces 73 and 75 of the roll 65 from which the tapered surfaces 61 and 63 respectively extend are also tapered.

The surfaces 77 and 79 of the ring 69 which engage the surfaces 61 and 73 are tapered to correspond to the surfaces 61 and 73 and are coextensive with surfaces 61 and 73 at the interface. The surfaces 81 and 83 are similarly coextensive with the surfaces 63 and 75 which they engage.

The bolts 67 penetrate through grooves 91 and 93 in the roll 65. The grooves 91 are precisely formed by electric-discharge machining to fit the bolts 67 (see FIG. 13). The other holes 93 are dimensioned to provide small clearance for the bolts.

In this case as in the case of the embodiment shown in FIGS. 1 through 4, the roll is pretensioned. The pretension in this case is substantially higher than in the embodiment of FIGS. 1 through 4. In the assemblies used in actual practice the groove 95 engaged by the work has a smaller radius (.116″) for FIGS. 5 through 10 than for FIGS. 1 through 4.

We claim as our invention:

1. A roll assembly for reducing work including a roll of the tungsten-carbide type having a periphery to apply a force to said work to reduce said work, clamping means for said roll, and means connected to said clamping means for applying a force to hold said clamping means in clamping and pretensioning relationship with said roll, the pretensioning counteracting the force of reaction to said reducing force impressed by said work on said roll.

2. The assembly of claim 1 wherein the roll is in the form of an annulus, and the clamping means includes cooperative clamping rings between which the roll is clamped by the clamping force, the clamping rings including surfaces engaging the inner periphery of the roll, the said surfaces of the clamping rings and the surface of said inner periphery, engaging said clamping ring surfaces, being so formed that pretensioning force is applied to said roll as a result of the application of said clamping force to said rings.

3. A roll assembly for reducing work including a roll of the tungsten-carbide type having a periphery to apply a force to said work to reduce said work, clamping means for said roll, and means connected to said clamping means for applying a force to hold said clamping means in clamping and pretensioning relationship with said roll, the pretensioning counteracting the force of reaction to said reducing force impressed by said work on said roll, said roll being in the form of an annulus, and the clamping means includes cooperative clamping rings between which the roll is clamped by the clamping force, the clamping rings including surfaces engaging the inner periphery of the roll, the inner periphery of the roll tapering from the bases of the roll to a region between the bases, and the engaging surfaces of the clamping rings being formed to engage the tapered surfaces thus formed, whereby an axial clamping force applied to the rings applies a radial component of force to the roll pretensioning the roll.

4. The assembly of claim 3 wherein the surfaces of the inner periphery of the roll are formed of truncated conical surfaces converging towards each other from the bases, and the engaging surfaces of the rings are formed to engage the conical surfaces coextensively, and the clamping force being applied axially whereby the axial force has a component perpendicular to the conical surfaces of the roll pretensioning the roll.

5. The assembly of claim 3 wherein the surfaces of the inner periphery of the roll are formed of truncated conical surfaces converging towards each other from the bases, and the engaging surfaces of the rings are formed to engage the conical surfaces coextensively, and the clamping force are applied by bolts which urge the clamping rings into clamping engagement with the roll.

6. The assembly of claim 3 wherein the clamping means also includes a plurality of bolts extending around the periphery of the clamping rings urging the clamping rings into clamping engagement with the roll, the inner periphery of the roll being formed of converging frusto-conical surfaces and the clamping rings having surfaces which engage said frusto-conical surfaces coextensively, so that the clamping force applied by the bolt has a force component perpendicular to said frusto-conical surfaces.

7. The assembly of claim 3 wherein the clamping means also includes a plurality of bolts extending around the periphery of the clamping rings urging the clamping rings into clamping engagement with the roll, the inner periphery of the roll being formed of converging frusto-conical surfaces and the clamping rings having surfaces which engage said frusto-conical surfaces coextensively, so that the clamping force applied by the bolts has a force component perpendicular to said frusto-conical surfaces, the frusto-conical surfaces extending between said clamping rings so that they are engaged by said bolts.

8. The assembly of claim 3 wherein the clamping means also includes a plurality of bolts extending around the periphery of the clamping rings and urging the clamping rings into clamping engagement with the roll, the inner periphery of the roll being formed of converging frusto-conical surfaces and the clamping rings having surfaces which engage said frusto-conical surfaces coextensively, so that the clamping force applied by the bolt has a force component perpendicular to said frusto-conical surfaces, the frusto-conical surfaces extending between said clamping rings so that they are engaged by said bolts, the roll having holes through which said bolts pass, two of said holes, diametrically disposed, being dimensioned to fit said bolts precisely, the remainder of said holes, being dimensioned to allow clearance for said bolts.

9. A roll of the tungsten carbide type for reducing work having annular bases extending from its periphery and having an inner peripheral surface formed of frusto-conical surfaces converging from said bases.

10. The roll of claim 9 having axial holes through the frusto-conical surfaces around the periphery of the roll, at least two of said holes, diametrically positioned, being precisely dimensioned.

References Cited

UNITED STATES PATENTS

| | | |
|---|---|---|
| 285,836 | 10/1883 | Otis. |
| 734,741 | 7/1903 | Parham. |
| 1,953,181 | 4/1934 | Lintereur. |
| 1,971,653 | 8/1934 | Levoy et al. |
| 2,342,159 | 2/1944 | Moran. |
| 2,749,133 | 6/1956 | Rich. |

BILLY J. WILHITE, *Primary Examiner.*

U.S. Cl. X.R.

29—148.4